(12) United States Patent
Nakai et al.

(10) Patent No.: US 10,860,193 B2
(45) Date of Patent: Dec. 8, 2020

(54) DISTRIBUTED COMPUTING TRANSITION SCREEN DISPLAY BASED ON APPLICATION TYPE

(71) Applicant: FUJITSU LIMITED, Kawasaki (JP)

(72) Inventors: Kenji Nakai, Kyoto (JP); Kazuo Yamakawa, Ikeda (JP)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 15/690,475

(22) Filed: Aug. 30, 2017

(65) Prior Publication Data

US 2018/0107368 A1 Apr. 19, 2018

(30) Foreign Application Priority Data

Oct. 14, 2016 (JP) .................................. 2016-202865

(51) Int. Cl.

| | |
|---|---|
| *G06F 3/0484* | (2013.01) |
| *G06Q 10/08* | (2012.01) |
| *G06F 8/38* | (2018.01) |
| *G06Q 10/10* | (2012.01) |
| *G06F 8/35* | (2018.01) |
| *G06F 9/54* | (2006.01) |

(52) U.S. Cl.
CPC ............ *G06F 3/04847* (2013.01); *G06F 8/35* (2013.01); *G06F 8/38* (2013.01); *G06F 9/547* (2013.01); *G06Q 10/087* (2013.01); *G06Q 10/103* (2013.01)

(58) Field of Classification Search
CPC ......... G06F 3/04847; G06F 8/35; G06F 9/547
See application file for complete search history.

(56) References Cited

U.S. PATENT DOCUMENTS

| | | | | |
|---|---|---|---|---|
| 2001/0052111 A1* | 12/2001 | Scott | .......................... | G06F 8/20 717/100 |
| 2003/0137540 A1* | 7/2003 | Klevenz | .................. | G06F 9/451 715/762 |

(Continued)

FOREIGN PATENT DOCUMENTS

| | | |
|---|---|---|
| JP | 2009-76017 A | 4/2009 |
| JP | 2011-96228 A | 5/2011 |
| JP | 2015-230669 A | 12/2015 |

*Primary Examiner* — Eric J. Bycer
(74) *Attorney, Agent, or Firm* — Westerman, Hattori, Daniels & Adrian, LLP

(57) ABSTRACT

A development support system includes: a first information processing apparatus including a storage that stores identification information of a plurality of screens according to a display application type; and a second information processing apparatus including an input interface that accepts registration of screen design information including designation of identification information of any screen, as a transition source screen or a transition destination screen, among the identification information of the plurality of screens, and a communication circuit that transmits the accepted screen design information to the first information processing apparatus, wherein the first information processing apparatus includes a communication circuit that refers to the storage when providing screen data to a first display application according to the screen design information, and the communication circuit performs a transmission, to the first display application, including a command to display a screen by a second display application.

6 Claims, 8 Drawing Sheets

(56) References Cited

U.S. PATENT DOCUMENTS

| | | | |
|---|---|---|---|
| 2009/0327953 A1* | 12/2009 | Honkala | G06F 3/04817 |
| | | | 715/804 |
| 2011/0078683 A1 | 3/2011 | Yamamoto et al. | |
| 2011/0119601 A1* | 5/2011 | Knothe | G06F 8/38 |
| | | | 715/760 |
| 2014/0115041 A1* | 4/2014 | Charles | G06F 9/44521 |
| | | | 709/203 |
| 2015/0156354 A1 | 6/2015 | Yamamoto et al. | |
| 2015/0269266 A1* | 9/2015 | Kuroda | G06F 16/954 |
| | | | 715/234 |
| 2015/0358487 A1 | 12/2015 | Sugiyama | |
| 2016/0261671 A1* | 9/2016 | AbiEzzi | H04L 67/025 |

* cited by examiner

| SCREEN ID | DISPLAY APPLICATION TYPE | ... |
|---|---|---|
| W01 | WEB | ... |
| W02 | WEB | ... |
| A01 | CLIENT | ... |
| A02 | CLIENT | ... |
| W03 | WEB | ... |
| ... | ... | ... |

DISTRIBUTED COMPUTING TRANSITION SCREEN DISPLAY BASED ON APPLICATION TYPE

CROSS-REFERENCE TO RELATED APPLICATION

This application is based upon and claims the benefit of priority of the prior Japanese Patent Application No. 2016-202865, filed on Oct. 14, 2016, the entire contents of which are incorporated herein by reference.

FIELD

The embodiment discussed herein is related to a development support system, a development support apparatus, a response control program, a response control method, and a response control apparatus.

BACKGROUND

Conventionally, for example, in a business application for inventory management and the like, a client-server system including a terminal with which a user inputs data and the like and a server that manages a database may be constructed. In addition, a system may also be constructed using a web system that accesses a web server and inputs data and the like using a web browser on a terminal (hereinafter also referred to as web browser). Furthermore, there is a system that achieves both a high degree of freedom of an application on a client-server system and ease of management of the web system, by using a hypertext transfer protocol (HTTP) and the like for communication between the application that operates on a terminal and a server. An example of such system is a web system called a smart client, and a system such as a business application may be constructed using the web system. Furthermore, it has also been proposed to control the license of an external service provided on a network so that an application installed in an information processing apparatus can cooperate with the external service.

Patent Literature 1: Japanese Laid-open Patent Publication No. 2015-230669
Patent Literature 2: Japanese Laid-open Patent Publication No. 2009-076017
Patent Literature 3: Japanese Laid-open Patent Publication No. 2011-096228

However, for example, in a web system called a smart client, a screen transition may occur between a screen of a terminal-side application that communicates using an HTTP and the like and a screen of an application on a web browser. In this case, the terminal-side application is developed using, for example, Visual Basic (registered trademark).NET (VB-.NET) and the like, while the application on the web browser is developed by HTML 5, Flash (registered trademark) and the like. For this reason, the developers of the above-described web system construct the system using different development languages. Therefore, the difficulty of development may be high.

SUMMARY

According to an aspect of an embodiment, a development support system includes: a first information processing apparatus including a storage that stores identification information of a plurality of screens according to a display application type; and a second information processing apparatus including an input interface that accepts registration of screen design information including designation of identification information of any screen, as a transition source screen or a transition destination screen, among the identification information of the plurality of screens, and a communication circuit that transmits the accepted screen design information to the first information processing apparatus, wherein the first information processing apparatus includes a communication circuit that refers to the storage when providing screen data to a first display application according to the screen design information, and in a case where it is determined that a display application type corresponding to identification information of the transition source screen or the transition destination screen is a type different from the first display application, the communication circuit performs a transmission, to the first display application, including a command to display a screen by a second display application.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. Note that the disclosed technology is not limited by the present embodiment. Furthermore, the following embodiment may be appropriately combined within a scope not inconsistent with herewith.

Figure 1:
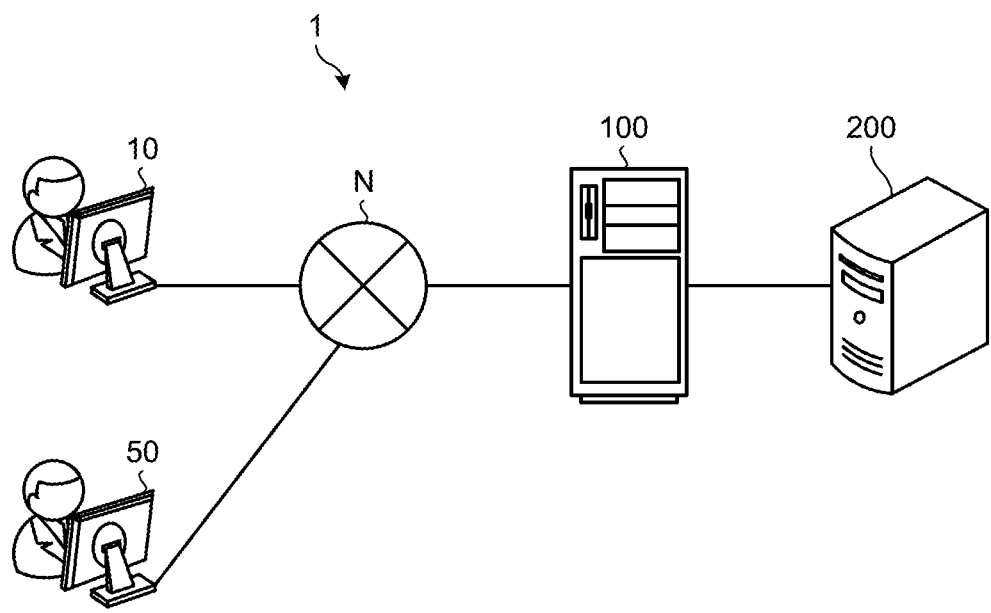
FIG. 1 is a diagram illustrating an exemplary configuration of a development support system according to an embodiment.

FIG. 1 is a diagram illustrating an exemplary configuration of a development support system according to an embodiment. A development support system 1 illustrated in FIG. 1 includes a developer terminal 10, a user terminal 50, a web server 100, and an application server 200. In FIG. 1, a case where the system includes one developer terminal 10, one user terminal 50, one web server 100, and one application server 200 is illustrated. However, the number of developer terminals 10, user terminals 50, web servers 100, and application servers 200 is not limited. That is, the development support system 1 may include any number of developer terminals 10, user terminals 50, web servers 100, and application servers 200.

The developer terminal 10 and the web server 100, as well as the user terminal 50 and the web server 100 are connected to each other via a network N so as to communicate with each other. Any kind of communication network such as the Internet, a local area network (LAN), and a virtual private network (VPN) can be adopted for such network N regardless of whether it is wired or wireless. Furthermore, the web server 100 and the application server 200 are connected to each other so as to communicate with each other by wires or wirelessly.

The development support system 1 is an example of a system that, for example, develops a business application using the developer terminal 10 and operates the business application using the user terminal 50. The developer terminal 10 is an information processing apparatus, for example, for a developer to develop a program that operates on the user terminal 50, the web server 100, and the application server 200. The developer terminal 10 accepts the registration of screen design information including designation of identification information of any screen, as a transition source screen or a transition destination screen, among identification information of a plurality of screens. The developer terminal 10 transmits the accepted screen design information to the web server 100.

The user terminal 50 is an information processing apparatus, for example, for performing work using a business application developed by a developer. The user terminal 50 executes, for example, a terminal-side application that operates on the user terminal 50 and a web application that operates on the web browser. For example, when accepting an input of a numerical value used for inventory management, the user terminal 50 transmits the accepted numerical data to the application server 200 via the web server 100. The transmitted numerical data is stored in the database of the application server 200.

The web server 100 is an information processing apparatus that, for example, transmits screen data for development in response to a request from the developer terminal 10. Furthermore, the web server 100 is an information processing apparatus that, for example, transmits screen data for business in response to a request from the user terminal 50 and relays exchange of data between the user terminal 50 and the application server 200.

The web server 100 stores the identification information of a plurality of screens in a storage unit according to a display application type. The web server 100 receives the screen design information including the identification information of the transition destination screen. The web server 100 provides screen data to a first display application according to the screen design information. At this time, the web server 100 refers to the storage unit. In a case where the web server 100 determines that a display application type corresponding to the identification information of the transition destination screen is a type different from the first display application, the web server 100 performs a transmission, to the first display application, including a command to display a screen by a second display application. As a result, the web server 100 can easily develop the web system.

Furthermore, when accepting a screen transition request from the web browser of the user terminal 50, the web server 100 refers to the storage unit that stores the identification information of a screen and the type of the screen in association with each other, and determines a type of the transition destination screen. In a case where the determined type corresponds to a client application different from the web browser, the web server 100 transmits, to the web browser, a response to the request including information indicating activation of the client application that displays the transition destination screen. In a case where the determined type corresponds to the web browser, the web server 100 transmits, to the web browser, a response to the request including information of the transition destination screen. As a result, the web server 100 can transmit information corresponding to the client application or the web browser according to the transition destination screen in the user terminal 50.

The application server 200 is an information processing apparatus that, for example, includes a database for inventory management or the like and exchanges input/output data of the database with the user terminal 50 via the web server 100. The application server 200 executes business logic processing that operates the database for inventory management or the like on data to be processed that is received from the user terminal 50 via the web server 100, for example. The application server 200 transmits the processed data of the business logic processing to the user terminal 50 via the web server 100.

Figure 2:
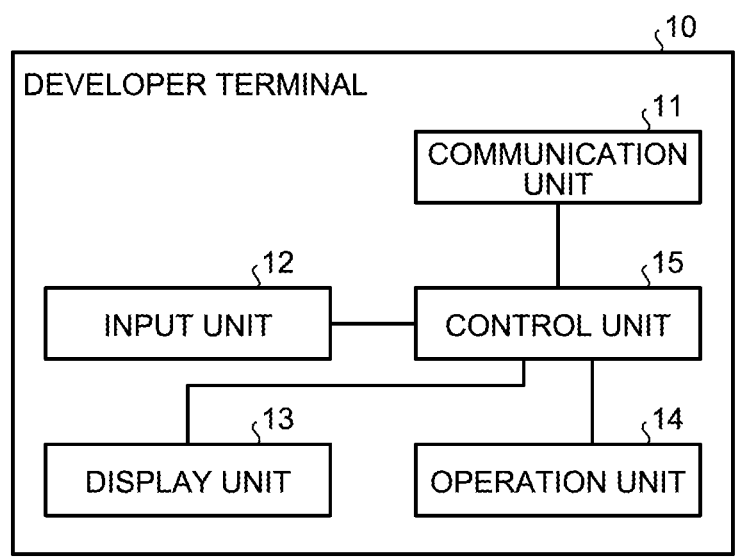
FIG. 2 is a block diagram illustrating an exemplary configuration of a developer terminal according to the embodiment.

Next, a configuration of the developer terminal 10 will be described. FIG. 2 is a block diagram illustrating an exemplary configuration of the developer terminal according to the embodiment. As illustrated in FIG. 2, the developer terminal 10 includes a communication unit 11, an input unit 12, a display unit 13, an operation unit 14, and a control unit 15. Note that the developer terminal 10 may include function units such as various input devices and audio output devices in addition to the function units illustrated in FIG. 2. As an example of the developer terminal 10, a stationary personal computer can be adopted. As the developer terminal 10, not only the above stationary personal computer but also a portable personal computer can be adopted. Furthermore, as the portable terminal, the developer terminal 10 may adopt, for example, a tablet terminal besides the above portable personal computer. Note that similarly, as for the user terminal 50, for example, a stationary or portable personal computer can be adopted. Therefore, the description of the configuration of the user terminal 50 will be omitted.

The communication unit 11 is implemented with, for example, a network interface card (NIC). The communication unit 11 is a communication interface that is connected to the web server 100 wirelessly or by wires via the network N and that controls communication of information with the web server 100. The communication unit 11 transmits, to the web server 100, the screen design information and a screen data request that are input from the control unit 15. Furthermore, the communication unit 11 receives screen data from the web server 100. The communication unit 11 outputs the received screen data to the control unit 15.

The input unit 12 is implemented with, for example, a medium access device for an external storage medium such as an optical disc, a universal serial bus (USB) memory, and an SD memory card. The input unit 12 reads the screen design information stored in the external storage medium and outputs the read screen design information to the control unit 15. The screen design information is information described, for example, in extensible markup language (XML). Note that the screen design information is information including designation of the identification information of any screen, as a transition source screen or a transition destination screen in the business application to be developed, among the identification information of a plurality of screens corresponding to display application types. Furthermore, the display application type is a type of the client application, that is, the terminal-side application and the web application that operates on the web browser.

The display unit 13 is a display device that displays various kinds of information. The display unit 13 is implemented with, for example, a liquid crystal display as a display device. The display unit 13 displays various screens based on various kinds of screen data that are input from the control unit 15.

The operation unit 14 is an input device that accepts various operations from a developer who is a user of the developer terminal 10. The operation unit 14 is implemented with, for example, a keyboard and a mouse as an input device. The operation unit 14 outputs the operation input by the user to the control unit 15 as operation information. Note that the operation unit 14 may be implemented with a touch panel or the like as an input device, and the display device of the display unit 13 and the input device of the operation unit 14 may be integrated.

The control unit 15 is implemented, for example, by executing a program stored in an internal storage device by a central processing unit (CPU), a micro processing unit (MPU), or the like, while a RAM is used as a work area. Furthermore, the control unit 15 may be implemented with, for example, an integrated circuit such as an application specific integrated circuit (ASIC) or a field programmable gate array (FPGA).

When the screen design information is input from the input unit 12, the control unit 15 accepts the registration of the screen design information. The control unit 15 transmits the accepted screen design information to the web server 100 via the communication unit 11 and the network N. Furthermore, in the control unit 15, the development work of the business application starts on the basis of the operation of the user. For example, in order to design a screen in the development work, the control unit 15 transmits a screen data request of the first display application to the web server 100 via the communication unit 11 and the network N. At this point, the first display application can be, for example, the web browser.

The control unit 15 receives the screen data corresponding to the screen data request from the web server 100 via the network N and the communication unit 11. The control unit 15 outputs the received screen data to the display unit 13 and causes the display unit 13 to display the screen data. Note that the received screen data includes a screen identifier (ID) for identifying the screen.

Next, the control unit 15 accepts a screen transition instruction from the user on the screen of the first display application being displayed, that is, for example, the web browser. When accepting the screen transition instruction, the control unit 15 acquires the screen ID of the transition destination from the screen information stored in the storage unit (not illustrated). The control unit 15 transmits a screen data request including the screen ID being displayed and the screen ID of the transition destination to the web server 100 via the communication unit 11 and the network N.

The control unit 15 receives the screen data corresponding to the screen data request from the web server 100 via the network N and the communication unit 11. In a case where the received screen data includes information indicating activation of the client application, that is, the terminal-side application, the control unit 15 activates the terminal-side application and displays the received screen data. Note that in a case where the terminal-side application is already activated, the control unit 15 displays the screen data received by the activated terminal-side application. In a case where the received screen data includes information corresponding to the web browser, the control unit 15 displays the received screen data on the web browser.

When displaying the screen data, the control unit 15 determines whether an instruction to end the development work has been accepted. In a case where the control unit 15 has not accepted the instruction to end the development work, the control unit 15 sets an application being displayed to the first display application, and continues the development work by the developer continuously. In a case where the control unit 15 has accepted the instruction to end the development work, the control unit 15 ends the development support processing.

Figures 3, 4:
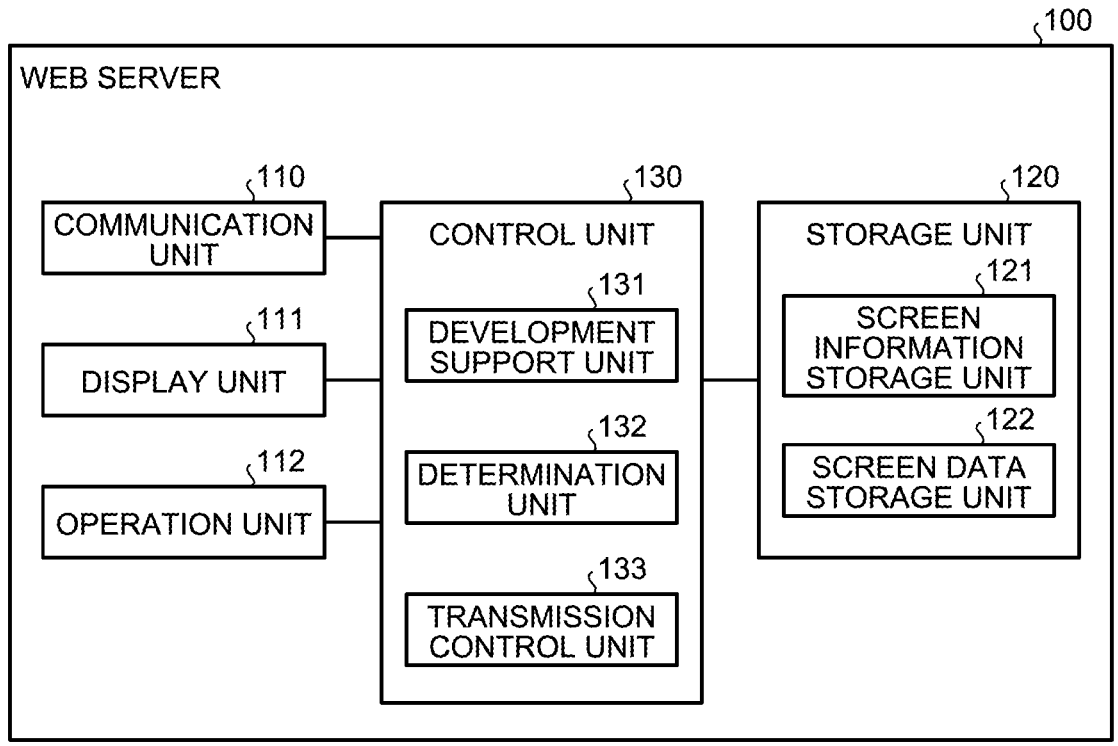
FIG. 3 is a block diagram illustrating an exemplary configuration of a web server according to the embodiment.
FIG. 4 is a diagram illustrating an example of a screen information storage unit.

Next, a configuration of the web server 100 will be described. FIG. 3 is a block diagram illustrating an exemplary configuration of the web server according to the embodiment. As illustrated in FIG. 3, the web server 100 includes a communication unit 110, a display unit 111, an operation unit 112, a storage unit 120, and a control unit 130. Note that in addition to the function units illustrated in FIG. 3, the web server 100 may include various function units of a known computer, for example, function units such as various input devices and audio output devices.

The communication unit 110 is implemented with, for example, an NIC. The communication unit 110 is connected to the developer terminal 10 and the user terminal 50 wirelessly or by wires via the network N. The communication unit 110 is a communication interface that controls communication of information between the developer terminal 10 and the user terminal 50. The communication unit 110 receives the screen design information and the screen data request from the developer terminal 10. The communication unit 110 outputs the received screen design information and screen data request to the control unit 130. Furthermore, the communication unit 110 transmits, to the developer terminal 10, the screen data input from the control unit 130.

Furthermore, the communication unit 110 receives a login screen data request, login information, and a screen transition request from the user terminal 50. The communication unit 110 outputs, to the control unit 130, the received login screen data request, login information, and screen transition request. Furthermore, the communication unit 110 transmits, to the user terminal 50, login screen data, portal screen data, screen data for web, and screen data for the terminal-side application that are input from the control unit 130.

Furthermore, the communication unit 110 transmits, to the application server 200, data to be processed that are input from the control unit 130. Furthermore, the communication unit 110 receives the processed data from the application server 200. The communication unit 110 outputs the received processed data to the control unit 130.

The display unit 111 is a display device that displays various kinds of information. The display unit 111 is implemented with, for example, a liquid crystal display as a display device. The display unit 111 displays various screens such as a display screen that are input from the control unit 130.

The operation unit 112 is an input device that accepts various operations from an administrator of the web server 100. The operation unit 112 is implemented with, for example, a keyboard and a mouse as an input device. The operation unit 112 outputs the operation input by the administrator to the control unit 130 as operation information.

The storage unit 120 is implemented with, for example, a semiconductor memory element such as a random access memory (RAM) and a flash memory, and a storage device such as a hard disk and an optical disc. The storage unit 120 includes a screen information storage unit 121 and a screen data storage unit 122. Furthermore, the storage unit 120 stores information used for processing in the control unit 130.

The screen information storage unit 121 stores the identification information of the plurality of screens according to the display application type. FIG. 4 is a diagram illustrating an example of the screen information storage unit. As illustrated in FIG. 4, the screen information storage unit 121 includes items such as "screen ID" and "display application type". The screen information storage unit 121 stores, for example, one record for each screen ID.

"Screen ID" is an identifier by which a screen displayed in the terminal-side application or the web browser is identified. "Display application type" is information indicating in which of the terminal-side application and the web browser the screen identified by the screen ID is displayed. "Display application type" indicates that if it is "client", the screen is displayed in the terminal-side application, that is, the client application, and indicates that if it is "web", the screen is displayed in the web browser.

The screen data storage unit 122 stores the screen data in association with the screen ID. Examples of the screen data include a file described in HTML, XML, or the like, and an image file. Furthermore, the screen data storage unit 122 also stores various screen data such as the login screen data and the portal screen data.

Returning to the explanation of FIG. 3, the control unit 130 is implemented, for example, by executing the program stored in the internal storage device by the CPU, the MPU, or the like, while using the RAM as the work area. Furthermore, the control unit 130 may be implemented with an integrated circuit such as an ASIC or an FPGA. The control unit 130 includes a development support unit 131, a determination unit 132, and a transmission control unit 133, and implements or executes the functions and operations of the information processing described below. Note that the internal configuration of the control unit 130 is not limited to the configuration illustrated in FIG. 3. Other configurations may be adopted as long as they are configurations in which the information processing described later is performed.

The development support unit 131 supports the development of the business application by transmitting, to the developer terminal 10, the screen data corresponding to the display application type. The development support unit 131 receives the screen design information from the developer terminal 10 via the network N and the communication unit 110. The development support unit 131 stores the received screen design information in the screen information storage unit 121.

After storing the screen design information in the screen information storage unit 121, the development support unit 131 receives the screen data request of the first display application from the developer terminal 10 via the network N and the communication unit 110. The development support unit 131 refers to the screen information storage unit 121 and acquires a screen ID corresponding to the received screen data request of the first display application. The development support unit 131 refers to the screen data storage unit 122 and acquires screen data corresponding to the acquired screen ID.

At this point, in a case where the first display application is the web browser, the development support unit 131 acquires screen data including information corresponding to the web browser. Furthermore, in a case where the first display application is the terminal-side application, the development support unit 131 acquires screen data including information indicating activation of the terminal-side application. The development support unit 131 transmits the acquired screen data to the developer terminal 10 via the communication unit 110 and the network N.

Furthermore, the development support unit 131 receives an image data request corresponding to the screen transition instruction from the developer terminal 10 via the network N and the communication unit 110. The development support unit 131 determines whether the received screen data request is of a type different from the first display application on the basis of the screen ID being displayed included in the received screen data request and the screen ID of the transition destination. In a case where the screen data request is not of a type different from the first display application, the development support unit 131 refers to the screen information storage unit 121 and acquires a screen ID corresponding to the screen data request corresponding to the screen transition instruction, that is, the screen data request of the first display application. The development support unit 131 refers to the screen data storage unit 122 and acquires screen data corresponding to the acquired screen ID. The development support unit 131 transmits the acquired screen data to the developer terminal 10 via the communication unit 110 and the network N.

In a case where the screen data request is of a type different from the first display application, the development support unit 131 refers to the screen information storage unit 121 and acquires a screen ID corresponding to the screen data request corresponding to the screen transition instruction. The development support unit 131 refers to the screen data storage unit 122 and acquires screen data corresponding to the acquired screen ID, that is, screen data including a command to display a screen by the second display application. The development support unit 131 transmits the acquired screen data to the developer terminal 10 via the communication unit 110 and the network N. Note that in the case of the image data request corresponding to the screen transition instruction, as in the case of the screen data request of the first display application, the screen data also includes information regarding the terminal-side application or the web browser.

That is, the development support unit 131 provides the screen data to the first display application according to the screen design information. When providing the screen data, the development support unit 131 refers to the screen information storage unit 121. In a case where the development support unit 131 determines that the display application type corresponding to the identification information of the transition destination screen is a type different from the first display application, the development support unit 131 performs a transmission, to the first display application, including a command to display a screen in the second display application. That is, the development support unit 131 is an example of a reception unit and a communication unit.

The determination unit 132 and the transmission control unit 133 transmit, to the user terminal 50, the screen data corresponding to the screen transition request, thereby executing the processing regarding the business application. The determination unit 132 receives the login screen data request from the user terminal 50 via the network N and the communication unit 110. The determination unit 132 refers to the screen data storage unit 122 and acquires login screen data. The determination unit 132 transmits the acquired login screen data to the user terminal 50 via the communication unit 110 and the network N.

Next, the determination unit 132 receives the login information from the user terminal 50 via the network N and the communication unit 110. The determination unit 132 executes the login processing on the basis of the received login information. In a case where the login is successful, the determination unit 132 refers to the screen data storage unit 122 and acquires the portal screen data. The determination unit 132 transmits the acquired portal screen data to the user terminal 50 via the communication unit 110 and the network N. Note that in a case where the login is unsuccessful, the determination unit 132 transmits error screen data to the user terminal 50.

After transmitting the portal screen data, the determination unit 132 receives the screen transition request from the user terminal 50 via the network N and the communication unit 110. When receiving the screen transition request, the determination unit 132 determines whether the screen transition request includes the business logic processing. In a case where the business logic processing is included, the determination unit 132 transmits data to be processed regarding the business logic processing to the application server 200 via the communication unit 110. Then, the determination unit 132 receives processed data of the business logic processing from the application server 200 via the communication unit 110.

That is, in the client application, the user interface processing is executed in the user terminal 50, and the business logic processing is executed in the application server 200. Note that the user interface processing is, for example, the processing of matching the language of the screen display with the language of the user terminal 50 and the processing of checking whether characters other than numerals are input in a numerical value input field. Furthermore, the business logic processing includes, for example, the processing of checking whether a number input in the numerical value input field is correct. Furthermore, the client application communicates with the application server 200 via the web server 100.

In a case where the business logic processing is not included in the screen transition request or a case where processed data of the business logic processing is received, the determination unit 132 refers to the screen information storage unit 121 to determine whether the type of the transition destination screen is web. Note that the type of the screen indicates the display application type of the screen information storage unit 121. In a case where the type of the transition destination screen is web, the determination unit 132 outputs, to the transmission control unit 133, a determination result indicating that the type is web. In a case where the type of the transition destination screen is not web, that is, in a case where the type is client, the determination unit 132 outputs, to the transmission control unit 133, a determination result indicating that the type is client.

That is, when accepting the screen transition request from the web browser of the user terminal 50, the determination unit 132 refers to the screen information storage unit 121 that stores the identification information of a screen and the type of the screen in association with each other, and determines a type of the transition destination screen.

When the determination result indicating that the type is web is input from the determination unit 132, the transmission control unit 133 refers to the screen data storage unit 122 and acquires screen data for web of the transition destination. The transmission control unit 133 transmits the acquired screen data for web to the user terminal 50 via the communication unit 110 and the network N.

When the determination result indicating that the type is client is input from the determination unit 132, the transmission control unit 133 refers to the screen data storage unit 122 and acquires screen data for the terminal-side application of the transition destination. The transmission control unit 133 includes information indicating activation of the terminal-side application in the acquired screen data for the terminal-side application. The transmission control unit 133 transmits the screen data for the terminal-side application including information indicating activation of the terminal-side application to the user terminal 50 via the communication unit 110 and the network N.

That is, in a case where the determined type corresponds to the client application different from the web browser, the transmission control unit 133 transmits, to the web browser, a response to the request including information indicating activation of the client application that displays the transition destination screen. Furthermore, in a case where the determined type corresponds to the web browser, the transmission control unit 133 transmits, to the web browser, a response to the request including the information of the transition destination screen.

Figure 5:
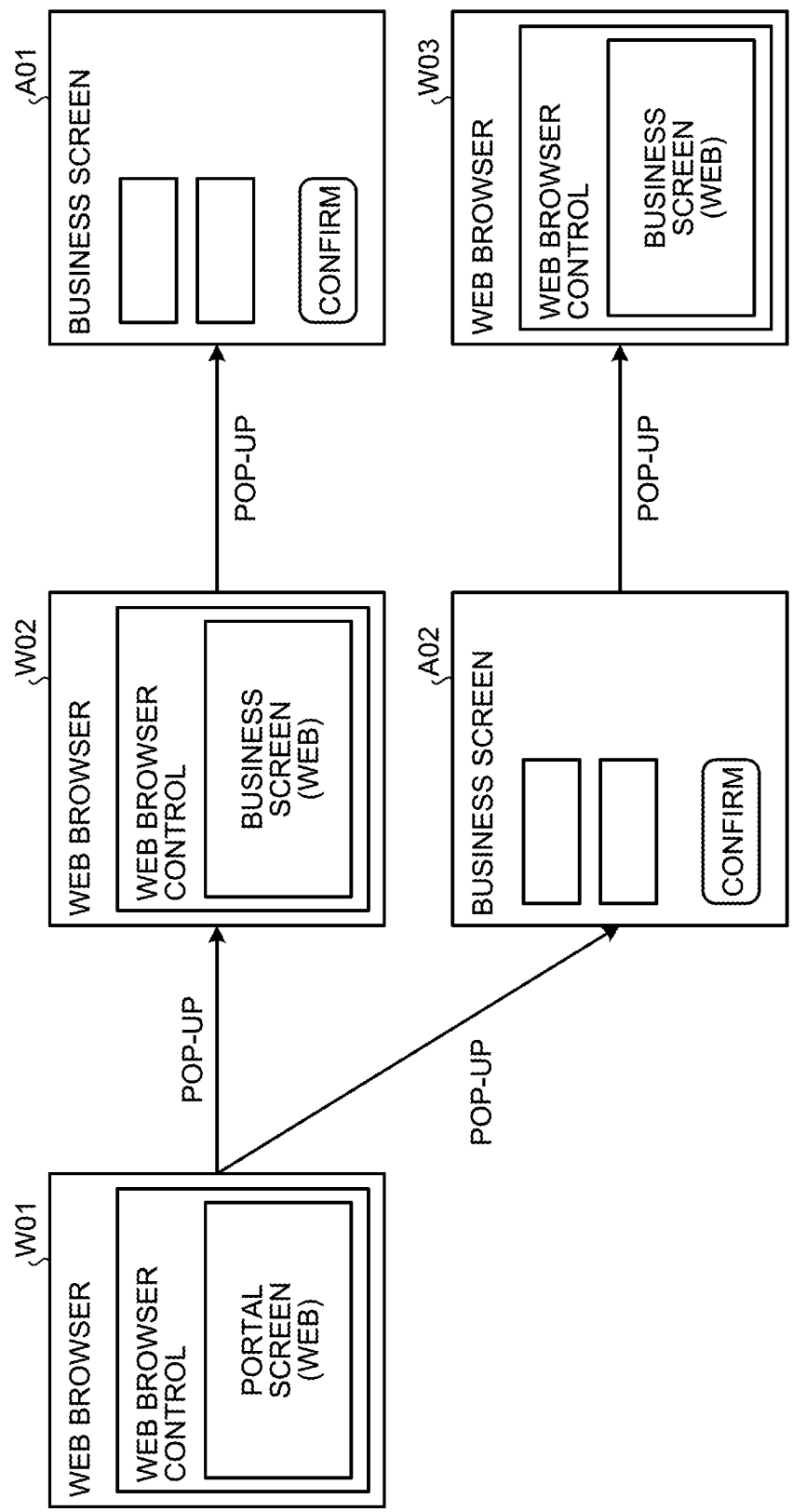
FIG. 5 is a diagram illustrating an example of a screen transition.

Herein, an example of a screen transition will be described with reference to FIG. 5. FIG. 5 is a diagram illustrating an example of the screen transition. In FIG. 5, the screen transition in the development work in the developer terminal 10 will be described. However, a similar screen transition occurs also when the business application is executed in the user terminal 50. As illustrated in FIG. 5, in a screen W01, the portal screen is displayed by the web browser control on the web browser. Next, in the screen W01, for example, when an instruction of a screen transition to a screen W02 is issued by the developer, since the screen W02 is displayed by the web browser, a business screen is displayed by the web browser control, similarly to the screen W01. At this time, as for the screen W02, for example, a window different from the screen W01 may be popped up and displayed, or the screen W02 May be displayed in the same window as the screen W01.

Subsequently, on the screen W02, for example, when an instruction of a screen transition to a screen A01 is issued by the developer, since the screen A01 is displayed by the terminal-side application, the terminal-side application is activated and the business screen is displayed. At this time, a window different from the screen W02 is popped up and displayed on the screen A01. Similarly, on the screen W01, for example, when an instruction of a screen transition to a screen A02 is issued by the developer, since the screen A02 is displayed by the terminal-side application, the terminal-side application is activated and the business screen is displayed. At this time, a window different from the screen W01 is popped up and displayed on the screen A02.

Furthermore, on the screen A02, for example, when an instruction of a screen transition to a screen W03 is issued by the developer, since the screen W03 is displayed by the web browser, the business screen is displayed by the web browser control on the web browser. At this time, a window different from the screen A02 is popped up and displayed on the screen W03. Note that the screen W03 may be displayed in the same window as the screen W01. Furthermore, as for a screen transition on each screen, a screen transition in the case of returning to the transition source is similar to a screen transition in the case of proceeding to the transition destination. In this way, the development support system 1 enables the development without regard to whether the screen of the transition destination is the screen of the web browser or the screen of the terminal-side application, thereby making it possible to easily develop the web system called a smart client.

Figure 6:
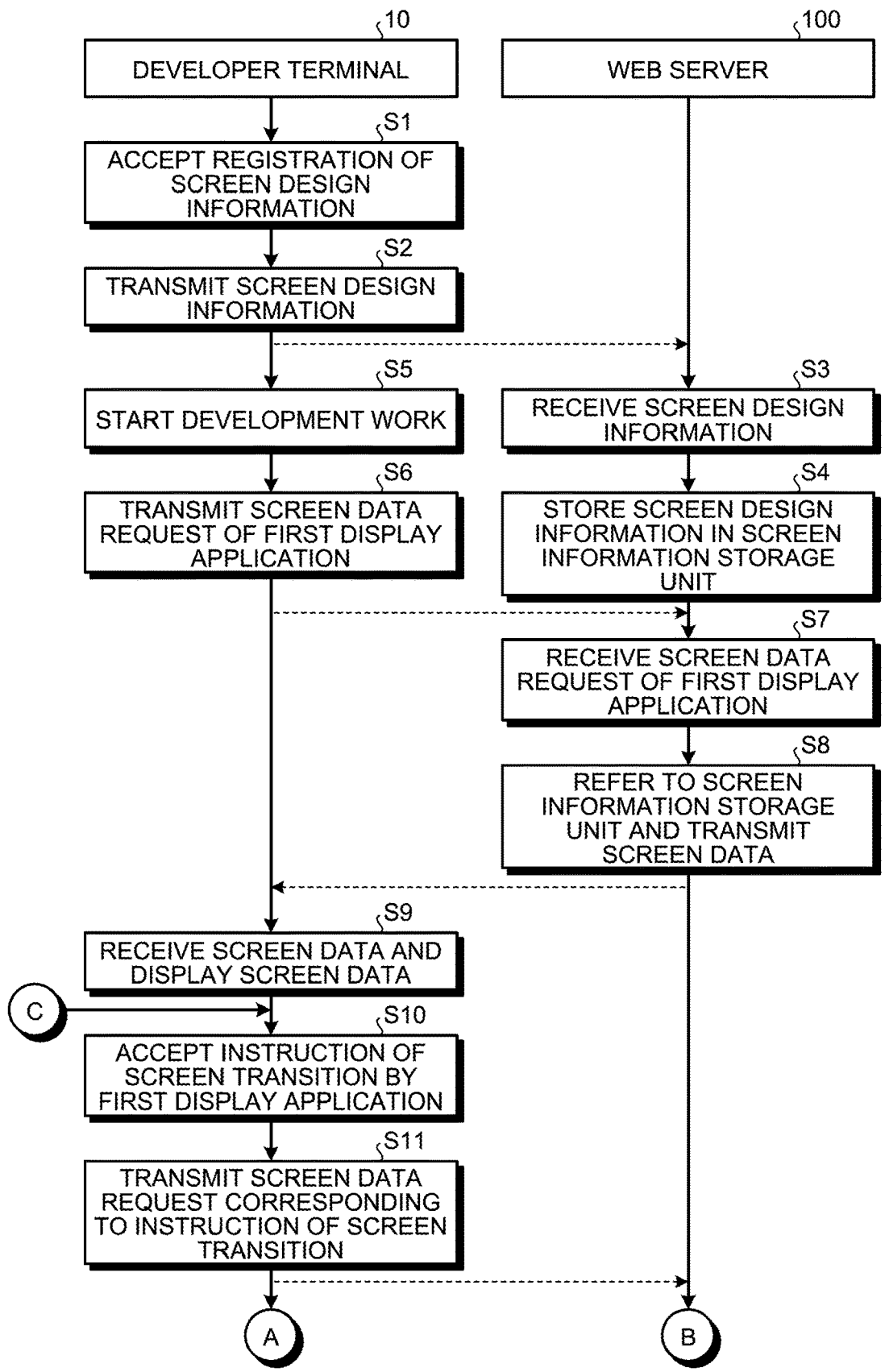
FIG. 6 is a sequence diagram illustrating an example of development support processing according to the embodiment.
Figure 7:
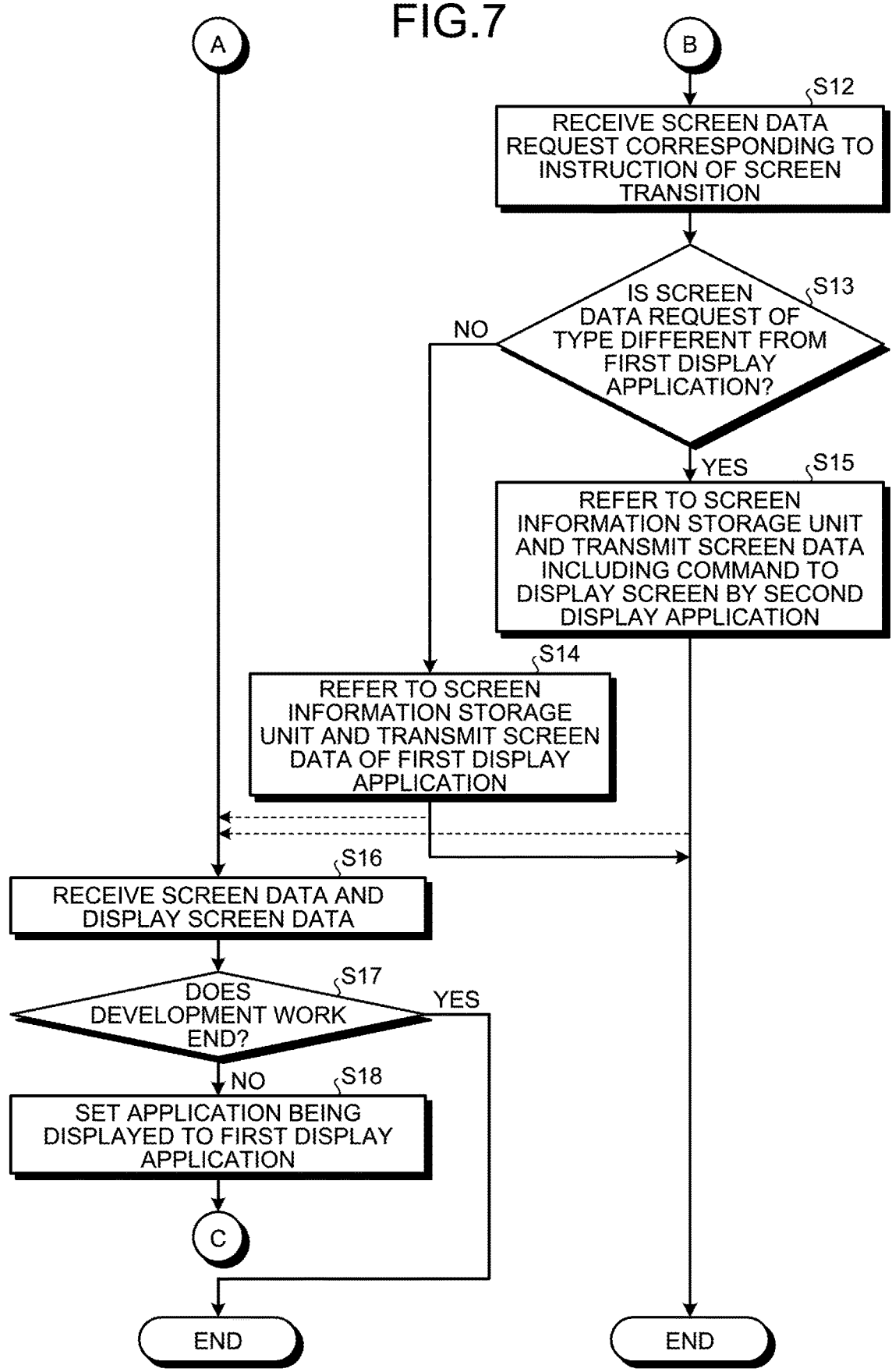
FIG. 7 is a sequence diagram illustrating an example of the development support processing according to the embodiment.

Next, the operation of the development support system 1 according to the embodiment will be described. First, the development support processing for the developer to perform system development will be described. FIGS. 6 and 7 are sequence diagrams illustrating an example of the development support processing according to the embodiment.

When the screen design information is input from the input unit 12, the control unit 15 of the developer terminal 10 accepts registration of the screen design information (step S1). The control unit 15 transmits the accepted screen design information to the web server 100 (step S2).

The development support unit 131 of the web server 100 receives the screen design information from the developer terminal 10 (step S3). The development support unit 131 stores the received screen design information in the screen information storage unit 121 (step S4).

In the control unit 15 of the developer terminal 10, the development work of the business application starts on the basis of the operation by the developer (step S5). The control unit 15 transmits, to the web server 100, a screen data request of, for example, the first display application that is the web browser (step S6).

The development support unit 131 of the web server 100 receives the screen data request of the first display application from the developer terminal 10 (step S7). The development support unit 131 refers to the screen information storage unit 121 and acquires a screen ID corresponding to the received screen data request of the first display application. The development support unit 131 refers to the screen data storage unit 122 and acquires screen data corresponding to the acquired screen ID. Note that since the first display application is assumed to be the web browser in step S6, the development support unit 131 acquires the screen data including information corresponding to the web browser. The development support unit 131 transmits the acquired screen data to the developer terminal 10 (step S8).

The control unit 15 of the developer terminal 10 receives the screen data corresponding to the screen data request from the web server 100. Since the received screen data is screen data including information corresponding to the web browser, the control unit 15 outputs the screen data received by the web browser to the display unit 13, and causes the display unit 13 to display the screen data (step S9).

The control unit 15 accepts a screen transition instruction from the user on the first display application being displayed, that is, on the screen of the web browser (step S10). When accepting the screen transition instruction, the control unit 15 transmits, to the web server 100, a screen data request corresponding to the screen transition instruction (step S11).

The development support unit 131 of the web server 100 receives an image data request corresponding to the screen transition instruction from the developer terminal 10 (step S12). The development support unit 131 determines whether the received screen data request is of a type different from the first display application (step S13). For example, in a case where the first display application being displayed is the web browser, the development support unit 131 determines whether the received screen data request is of a type different from the web browser. Furthermore, for example, in a case where the first display application being displayed is a terminal-side application, the development support unit 131 determines whether the received screen data request is of a type different from the terminal-side application.

In a case where the screen data request is not of a type different from the first display application (step S13: No), the development support unit 131 refers to the screen information storage unit 121 and acquires a screen ID corresponding to the screen data request of the first display application. The development support unit 131 refers to the screen data storage unit 122 and acquires screen data corresponding to the acquired screen ID. The development support unit 131 transmits the acquired screen data to the developer terminal 10 (step S14).

In a case where the screen data request is of a type different from the first display application (step S13: Yes), the development support unit 131 refers to the screen information storage unit 121 and acquires a screen ID corresponding to the screen data request of the second display application. The development support unit 131 refers to the screen data storage unit 122 and acquires screen data corresponding to the acquired screen ID, that is, screen data including a command to display a screen by the second display application. The development support unit 131 transmits the acquired screen data to the developer terminal 10 (step S15).

The control unit 15 of the developer terminal 10 receives the screen data corresponding to the screen data request from the web server 100. The control unit 15 causes the display unit 13 to display the received screen data by using the display application corresponding to the information included in the received screen data (step S16).

The control unit 15 determines whether the instruction to end the development work has been accepted (step S17). In a case where the control unit 15 has not accepted the instruction to end the development work (step S17: No), the control unit 15 sets the application being displayed to the first display application (step S18), and the processing returns to step S10. In a case where the control unit 15 has accepted the instruction to end the development work (step S17: Yes), the control unit 15 ends the development support processing. As a result, the development support system 1 can easily develop the web system. Furthermore, the development support system 1 can also develop applications on a web browser using, for example, VB.NET (Visual Basic (registered trademark).NET) that is a development language of a terminal-side application.

Figure 8:
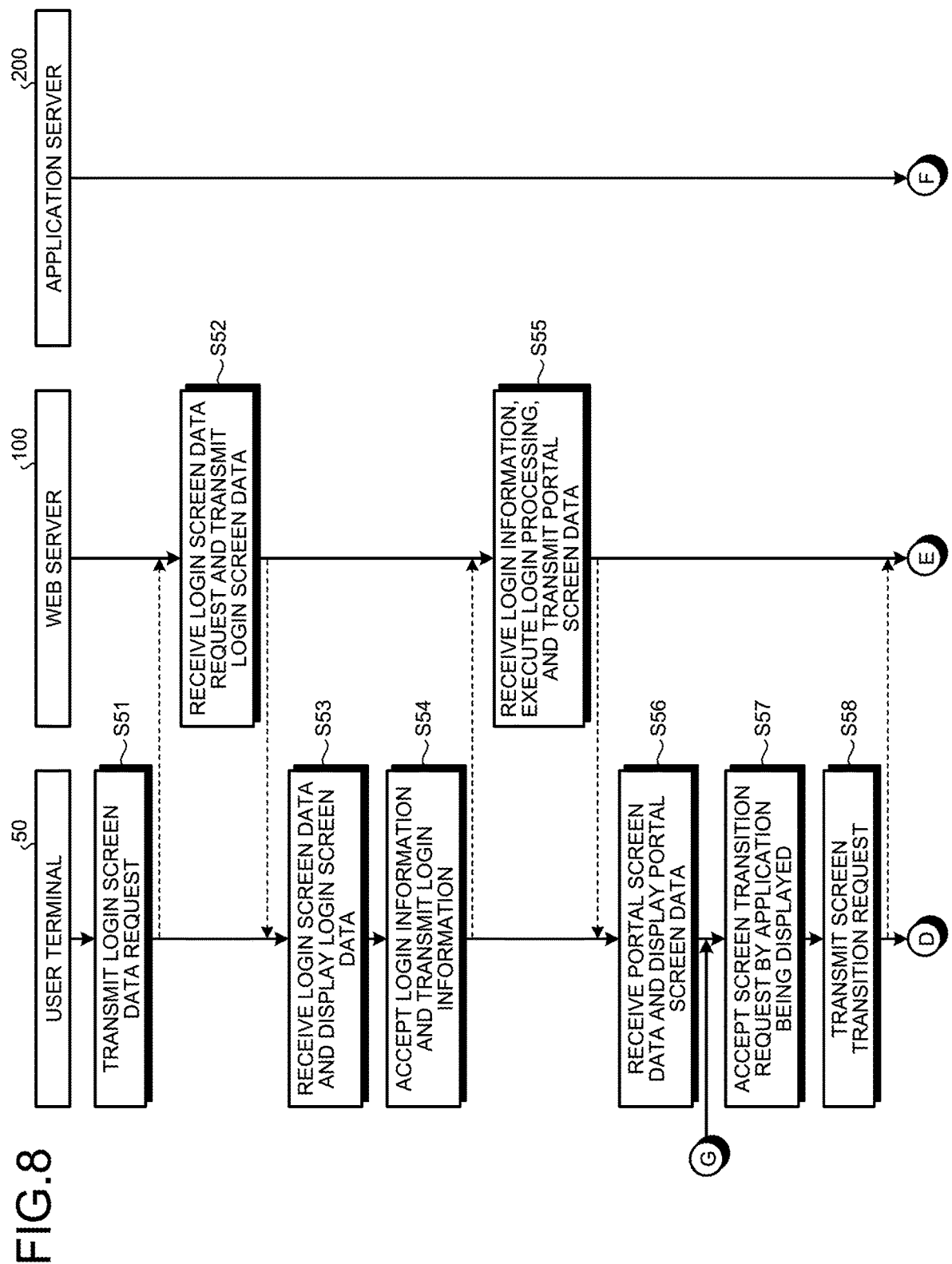
FIG. 8 is a sequence diagram illustrating an example of application execution processing according to the embodiment.
Figure 9:
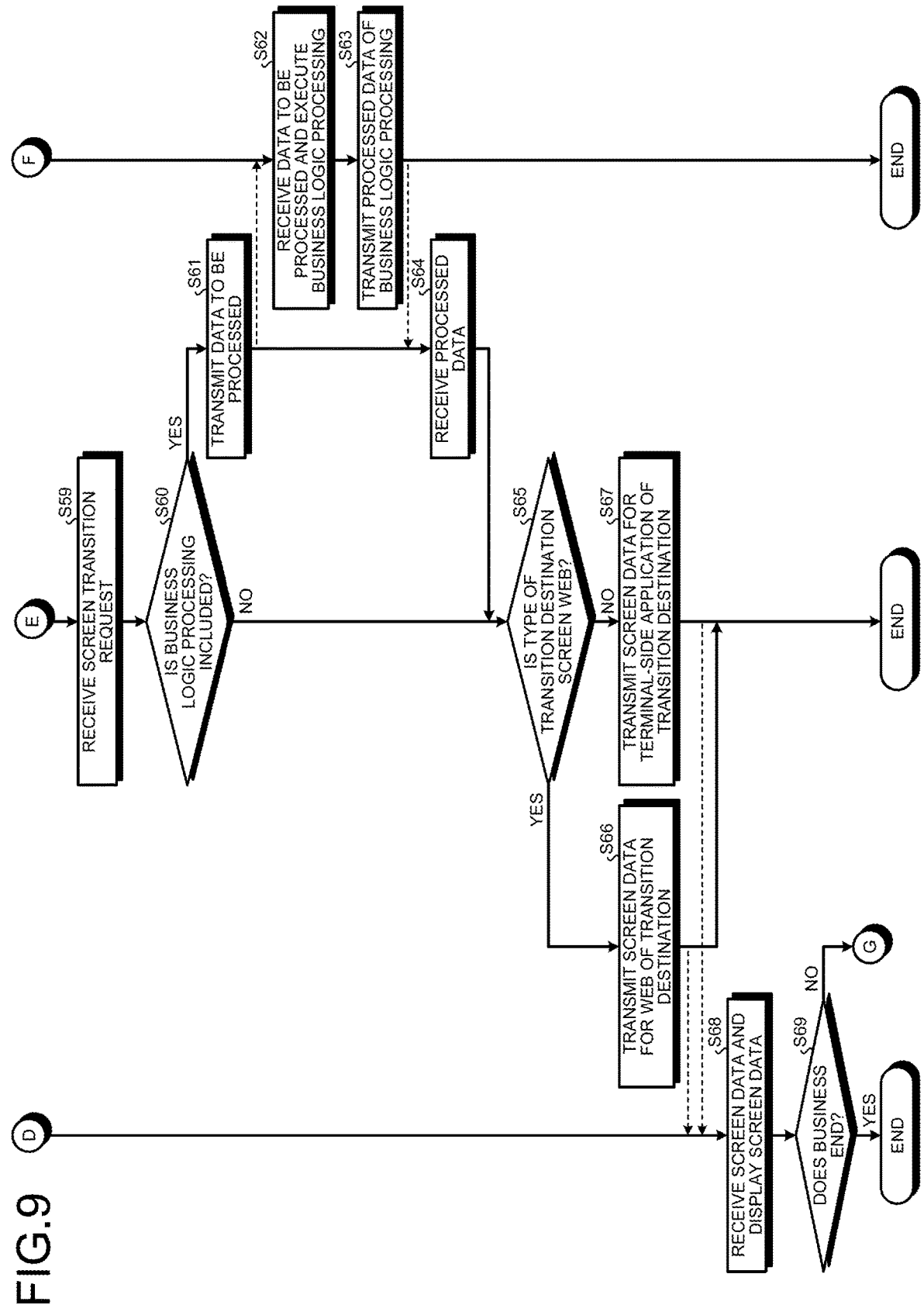
FIG. 9 is a sequence diagram illustrating an example of the application execution processing according to the embodiment.

Next, the application execution processing in a case where the user of the user terminal 50 uses the business application will be described. FIGS. 8 and 9 are sequence diagrams illustrating an example of the application execution processing according to the embodiment.

The user terminal 50 transmits a login screen data request to the web server 100 (step S51). The determination unit 132 of the web server 100 receives the login screen data request from the user terminal 50. The determination unit 132 refers to the screen data storage unit 122 and acquires login screen data. The determination unit 132 transmits the acquired login screen data to the user terminal 50 (step S52).

When receiving the login screen data from the web server 100, the user terminal 50 causes a display unit (not illustrated) to display the login screen data (step S53). When accepting the input of the login information from the user on the login screen, the user terminal 50 transmits the accepted login information to the web server 100 (step S54).

The determination unit 132 receives the login information from the user terminal 50. The determination unit 132 executes the login processing on the basis of the received login information. In a case where the login is successful, the determination unit 132 refers to the screen data storage unit 122 and acquires the portal screen data. The determination unit 132 transmits the acquired portal screen data to the user terminal 50 (step S55).

When receiving the portal screen data from the web server 100, the user terminal 50 displays the portal screen data on a display unit (not illustrated) (step S56). The user terminal 50 accepts the screen transition request from the user by the application being displayed (step S57). For example, if the portal screen is being displayed, the user terminal 50 accepts the screen transition request on the portal screen. The user terminal 50 transmits the accepted screen transition request to the web server 100 (step S58).

The determination unit 132 of the web server 100 receives the screen transition request from the user terminal 50 (step S59). The determination unit 132 determines whether the business logic processing is included in the received screen transition request (step S60). In a case where the business logic processing is not included (step S60: No), the processing in the determination unit 132 proceeds to step S65. In a case where the business logic processing is included (step S60: Yes), the determination unit 132 transmits, to the application server 200, data to be processed regarding the business logic processing (step S61).

The application server 200 receives the data to be processed from the web server 100. The application server 200 executes the business logic processing with respect to the received data to be processed (step S62). The application server 200 transmits processed data of the business logic processing to the web server 100 (step S63).

The determination unit 132 of the web server 100 receives processed data of the business logic processing from the application server 200 (step S64). The determination unit 132 refers to the screen information storage unit 121 and determines whether the type of the transition destination screen is web (step S65). In a case where the type of the transition destination screen is web (Step S65: Yes), the determination unit 132 outputs, to the transmission control unit 133, a determination result indicating that the type is web. When the determination result indicating that the type is web is input from the determination unit 132, the transmission control unit 133 refers to the screen data storage unit 122 and acquires screen data for web of the transition destination. The transmission control unit 133 transmits the acquired screen data for web of the transition destination to the user terminal 50 (step S66).

In a case where the type of the transition destination screen is client (step S65: No), the determination unit 132 outputs, to the transmission control unit 133, a determination result indicating that the type is client. When the determination result indicating that the type is client is input from the determination unit 132, the transmission control unit 133 refers to the screen data storage unit 122 and acquires screen data for the terminal-side application of the transition destination. The transmission control unit 133 includes information indicating activation of the terminal-side application in the acquired screen data for the terminal-side application.

The transmission control unit 133 transmits, to the user terminal 50, the screen data for the terminal-side application of the transition destination (step S67).

The user terminal 50 receives the screen data corresponding to a screen transition request from the web server 100. The user terminal 50 displays the received screen data on a display unit (not illustrated) using a display application corresponding to the information included in the received screen data (step S68).

The user terminal 50 determines whether an instruction to end the business application has been accepted (step S69). In a case where the user terminal 50 has not accepted the instruction to end the business application (step S69: No), the processing returns to step S57. In a case where the user terminal 50 has accepted the instruction to end the business application (step S69: Yes), the user terminal 50 ends the application execution processing. As a result, for example, each time data is input, the development support system 1 can check the input regarding the user interface. Therefore, the load of the data input can be reduced.

As described above, the development support system 1 includes the web server 100 as the first information processing apparatus and the developer terminal 10 as the second information processing apparatus. The first information processing apparatus stores the identification information of a plurality of screens in the screen information storage unit 121 according to a display application type. The second information processing apparatus accepts the registration of the screen design information including designation of identification information of any screen, as a transition source screen or a transition destination screen, among identification information of a plurality of screens. Furthermore, the second information processing apparatus transmits the accepted screen design information to the first information processing apparatus. The first information processing apparatus provides screen data to the first display application according to the screen design information. The first information processing apparatus refers to the screen information storage unit 121. In a case where the first information processing apparatus determines that the display application type corresponding to the identification information of the transition source screen or the transition destination screen is a type different from the first display application, the first information processing apparatus performs a transmission, to the first display application, including a command to display a screen by the second display application. As a result, the web system can be easily developed.

Furthermore, the web server 100 that is a development support apparatus stores the identification information of a plurality of screens in the screen information storage unit 121 according to the display application type. Furthermore, the web server 100 receives the screen design information including the identification information of the transition destination screen. Furthermore, the web server 100 provides screen data to the first display application according to the screen design information. The web server 100 refers to the screen information storage unit 121. In a case where the web server 100 determines that the display application type corresponding to the identification information of the transition destination screen is a type different from the first display application, the web server 100 performs a transmission, to the first display application, including a command to display a screen by the second display application. As a result, the web system can be easily developed.

Furthermore, when accepting the screen transition request from the web browser of the user terminal 50, the web server 100 refers to the screen information storage unit 121 that stores the identification information of a screen and the type of the screen in association with each other, and determines a type of the transition destination screen. Furthermore, in a case where the determined type corresponds to the client application different from the web browser, the web server 100 transmits, to the web browser, a response to the request including information indicating activation of the client application that displays the transition destination screen. Furthermore, in a case where the determined type corresponds to the web browser, the web server 100 transmits, to the web browser, a response to the request including information of the transition destination screen. As a result, the load of data input in the user terminal 50 can be reduced.

Furthermore, in the client application on the development support system 1, the user interface processing is executed in the user terminal 50, and the business logic processing is executed in the application server 200. As a result, each time data is input, it is possible to check the input regarding the user interface. Therefore, the load of the data input in the user terminal 50 can be reduced.

Furthermore, in the development support system 1, the client application communicates with the application server 200 via the web server 100. As a result, it is possible to easily intercommunicate between the client application and the web application at the data input in the user terminal 50. Therefore, the load of data input can be reduced.

Note that in the above embodiment, a server side of the development support system 1 is constructed using the web server 100 and the application server 200, but the embodiment is not limited thereto. For example, the server side of the development support system 1 may be constructed using various forms of cloud computing technology such as software as a service (SaaS).

Furthermore, each constituent element of each unit as illustrated in the drawing does not need to be physically configured as illustrated in the drawing. In other words, the specific form of distribution and integration of each unit is not limited to that illustrated in the drawing, and all or a part thereof may be distributed or integrated functionally or physically in any units, depending on various loads, usage conditions and the like. For example, the development support unit 131, the determination unit 132, and the transmission control unit 133 may be separated. Furthermore, each illustrated processing is not limited to the above sequence, and as long as the processing contents do not conflict, the processing may be executed at the same time or may be executed in changed sequence.

Furthermore, all or any part of various processing functions performed by each device may be executed on a CPU (or a microcomputer such as an MPU and a micro controller unit (MCU)). Furthermore, it is needless to say that all or any part of the various processing functions are executed on a program analyzed and executed by a CPU (or microcomputer such as MPU and MCU), or on hardware using a wired logic.

Figure 10:
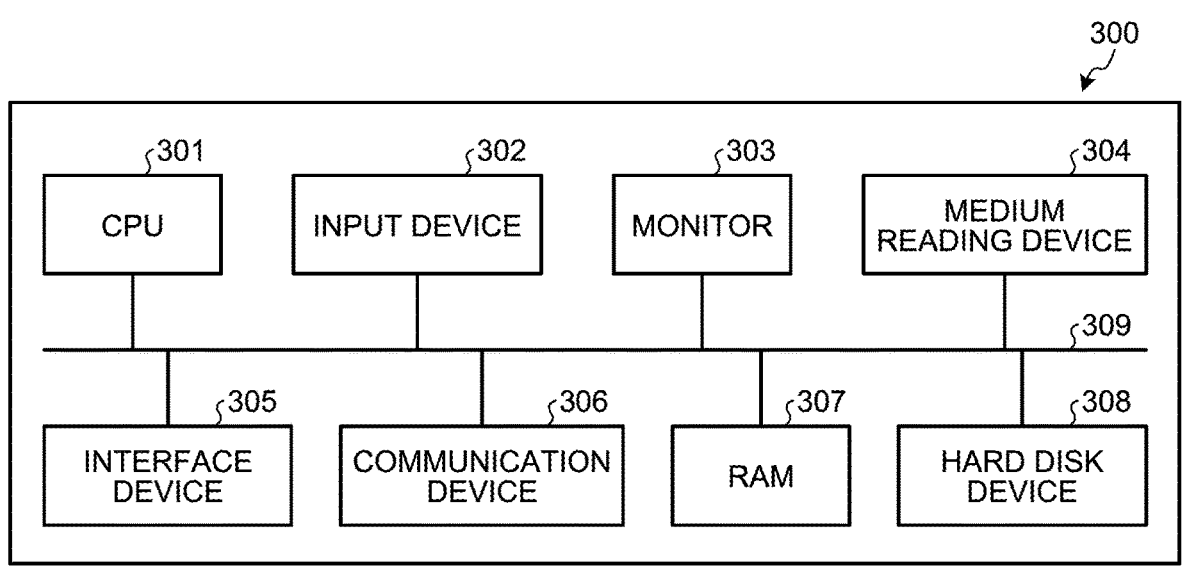
FIG. 10 is a diagram illustrating an example of a computer that executes a response control program.

Incidentally, various kinds of processing described in the above embodiment can be implemented by executing a program prepared in advance on a computer. Therefore, in the following, an example of a computer that executes a program including functions similar to the functions in the above embodiment will be described. FIG. 10 is a diagram illustrating an example of a computer that executes a response control program.

As illustrated in FIG. 10, a computer 300 includes a CPU 301 that executes various kinds of arithmetic processing, an input device 302 that accepts a data input, and a monitor 303. Furthermore, the computer 300 includes a medium reading device 304 that reads a program and the like from a storage medium, an interface device 305 that is connected to various devices, a communication device 306 that is connected to another information processing apparatus and the like by wires or wirelessly. Furthermore, the computer 300 includes a RAM 307 that temporarily stores various kinds of information and a hard disk device 308. Furthermore, the devices 301 to 308 are each connected to a bus 309.

The hard disk device 308 stores a response control program including functions similar to the functions of the respective processing units of the development support unit 131, the determination unit 132, and the transmission control unit 133 illustrated in FIG. 3. Furthermore, in the hard disk device 308, various kinds of data for implementing the screen information storage unit 121, the screen data storage unit 122, and the response control program are stored. The input device 302 includes, for example, a function similar to the function of the operation unit 112 illustrated in FIG. 3, and accepts inputs of various kinds of information such as operation information from an administrator of the computer 300. The monitor 303 displays, for example, various screens such as the display screen to the administrator of the computer 300. A printing device and the like, for example, are connected to the interface device 305. The communication device 306 includes, for example, a function similar to the function of the communication unit 110 illustrated in FIG. 3, and is connected to the developer terminal 10, the user terminal 50, and the application server 200, and exchanges various kinds of information with the developer terminal 10, the user terminal 50, and the application server 200.

The CPU 301 reads each program stored in the hard disk device 308, develops the program in the RAM 307, and executes the program, thereby performing various kinds of processing. Furthermore, these programs can cause the computer 300 to function as the development support unit 131, the determination unit 132, and the transmission control unit 133 illustrated in FIG. 3.

Note that the above response control program does not need to be stored in the hard disk device 308. For example, the computer 300 may read and execute a program stored in a storage medium readable by the computer 300. The storage medium readable by the computer 300 corresponds to, for example, a portable recording medium such as a CD-ROM, a DVD disk, a universal serial bus (USB) memory, a semiconductor memory such as a flash memory, and a hard disk drive. Furthermore, the response control program may be stored in a device connected to a public line, the Internet, a LAN, or the like, and the computer 300 may read from the device and execute the response control program.

A web system can be easily developed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A development support system comprising:
   a first information processing apparatus including a storage that stores identification information that identifies each of a plurality of screens and, in association therewith, a type of a display application that displays a screen identified by the identification information; and a second information processing apparatus including an input interface that accepts registration of screen design information when a first screen displayed by a first display application is displayed on the second information processing apparatus, the screen design information including designation of identification information of at least one of the plurality of screens as a second screen that is a transition source of the first screen or a transition destination from the first screen, and a communication circuit that transmits the accepted screen design information to the first information processing apparatus, wherein the first information processing apparatus also includes a control unit that, when, by referring to the storage, determining that the type of the display application corresponding to the identification information designated in the screen design information received from the second information processing apparatus is different from the type of the first display application and corresponds to a second display application, transmits, via a communication circuit, screen data according to the screen design information to the first display application, with a command to display the second screen by the second display application, and wherein the determining by the first information processing apparatus, that the type of the display application corresponding to the identification information designated in the screen design information received from the second information processing apparatus is different from the type of the first display application, includes determining that one type of the display application is a web browser and another type of the display application is a client application that is different from the web browser.

2. A development support apparatus comprising:

a storage that stores identification information that identifies each of a plurality of screens and, in association therewith, a type of a display application that displays a screen identified by the identification information;

a reception circuit that receives, from a terminal, screen design information when a first screen displayed by a first display application is displayed on the terminal, the screen design information including identification information of at least one of the plurality of screens as a second screen that is a transition destination from the first screen; and a control unit that, when, by referring to the storage, determining that the type of the display application corresponding to the identification information included in the screen design information received from the terminal is different from the type of the first display application and corresponds to a second display application, transmits, via a communication circuit, screen data according to the screen design information to the first display application, with a command to display the second screen by the second display application, wherein the determining by the control unit, that the type of the display application corresponding to the identification information designated in the screen design information received from the second information processing apparatus is different from the type of the first display application, includes determining that one type of the display application is a web browser and another type of the display application is a client application that is different from the web browser.

3. A non-transitory computer-readable recording medium having stored therein a response control program that causes a computer to execute a process comprising:

when the computer receives from a terminal a screen transition request from a web browser displayed on the terminal, referring to a storage that stores identification information that identifies each of a plurality of screens, a first screen among the plurality of screens being displayed on the web browser, and a type of an application that displays a screen identified by the identification information in association with each other, and determining the type associated with a second screen that is a transition destination from the first screen included in the screen transition request and is at least one of the plurality of screens; and transmitting, from the computer to the web browser, a response to the screen transition request, the response including screen data of the second screen and information indicating activation of a client application the type of which is associated with the second screen and that displays the second screen on the terminal, in a case where the determined type corresponds to the client application different from the web browser, and transmitting, from the computer to the web browser, the response to the screen transition request, the response including screen data of the second screen, in a case where the determined type corresponds to the web browser, wherein the client application executes a user interface processing on the terminal and has an application server connected to the computer execute a business logic processing.

4. The non-transitory computer-readable recording medium according to claim 3, wherein the client application communicates with the application server via the computer.

5. A response control method executed by a computer, the response control method comprising:

when the computer receives from a terminal a screen transition request from a web browser displayed on the terminal, referring to a storage that stores identification information that identifies each of a plurality of screens, a first screen among the plurality of screens being displayed on the web browser, and a type of an application that displays a screen identified by the identification information in association with each other, and determining the type associated with a second screen that is a transition destination from the first screen included in the screen transition request and is at least one of the plurality of screens, using a processor; and transmitting, from the computer to the web browser, a response to the screen transition request, the response including screen data of the second screen and information indicating activation of a client application the type of which is associated with the second screen and that displays the second screen on the terminal, in a case where the determined type corresponds to the client application different from the web browser, and transmitting, from the computer to the web browser, the response to the screen transition request, the response including screen data of the second screen, in a case where the determined type corresponds to the web browser, wherein the client application executes a user interface processing on the terminal and has an application server connected to the computer execute a business logic processing, using the processor.

6. A response control apparatus comprising:

a memory; and a processor coupled to the memory, wherein the processor executes a process comprising:

when the computer receives from a terminal a screen transition request from a web browser displayed on the terminal, referring to a storage that stores identification information that identifies each of a plurality of screens, a first screen among the plurality of screens being displayed on the web browser, and a type of an application that displays a screen identified by the identification information in association with each other, and determining the type associated with a second screen that is a transition destination from the first screen included in the screen transition request and is at least one of the plurality of screens; and transmitting, from the computer to the web browser, a response to the screen transition request, the response including screen data of the second screen and information indicating activation of a client application the type of which is associated with the second screen and that displays the second screen on the terminal, in a case where the determined type corresponds to the client application different from the web browser, and transmitting, from the computer to the web browser, the response to the screen transition request, the response including screen data of the second screen, in a case where the determined type corresponds to the web browser, wherein the client application executes a user interface processing on the terminal and has an application server connected to the computer execute a business logic processing.

\* \* \* \* \*